(12) United States Patent
Menard

(10) Patent No.: US 7,186,103 B2
(45) Date of Patent: Mar. 6, 2007

(54) TIRE TREAD MOULD

(75) Inventor: Gilbert Menard, Domicile (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 378 days.

(21) Appl. No.: 10/773,469

(22) Filed: Feb. 5, 2004

(65) Prior Publication Data

US 2004/0197432 A1 Oct. 7, 2004

Related U.S. Application Data

(63) Continuation of application No. PCT/EP02/08759, filed on Feb. 20, 2003.

(30) Foreign Application Priority Data

Aug. 7, 2001 (FR) .................................... 01 10569

(51) Int. Cl.
*B29C 33/44* (2006.01)
(52) U.S. Cl. ...................... 425/28.1; 425/443; 425/444
(58) Field of Classification Search .............. 425/28.1, 425/436 R, 441, 443, 444
See application file for complete search history.

(56) References Cited

U.S. PATENT DOCUMENTS

| 1,784,780 | A | * | 12/1930 | Bronson ..................... 425/441 |
| 4,076,483 | A | | 2/1978 | Smirne ....................... 425/444 |
| 5,316,461 | A | * | 5/1994 | Silvestri ................. 425/436 R |
| 5,932,153 | A | * | 8/1999 | Keys .......................... 425/28.1 |
| 6,187,247 | B1 | * | 2/2001 | Buzzell et al. ............. 425/444 |
| 6,616,884 | B1 | * | 9/2003 | Sorensen et al. .......... 264/318 |

FOREIGN PATENT DOCUMENTS

| EP | 0807507 | | 11/1997 |
| FR | 1524052 | | 5/1968 |
| JP | 60-89313 | * | 5/1985 |
| JP | 05111921 | | 5/1993 |

* cited by examiner

*Primary Examiner*—James P. Mackey
(74) *Attorney, Agent, or Firm*—Fitzpatrick, Cella, Harper & Scinto

(57) ABSTRACT

The invention relates to a tire tread mould comprising a lower molding part (2) and an upper molding part (3) defining respectively the outer surface or the inner surface of a tread, at least one of the parts being movable between two positions corresponding to the opening and closure of the mould (1), in which the upper molding part (3) bears elements (6) for hooking one of the longitudinal ends of the tread.

15 Claims, 4 Drawing Sheets

TIRE TREAD MOULD

This is a continuation of International Application PCT/EP02/08759, which was published in French on Feb. 20, 2003, as International Publication WO03/013819 and which claims priority of French Application No. 01/10569, filed Aug. 7, 2001.

BACKGROUND OF THE INVENTION

The invention relates to a mould for tire treads, these treads possibly being intended equally well for capping new tires or for recapping.

In what follows, "inner" surface of a tread will be understood to mean the surface of the tread which is intended to be laid on the tire and therefore oriented towards the inside relative to the center of the tire, and "outer" surface will be understood to mean the surface intended to be in contact with the ground when the tread is laid on the tire and therefore oriented towards the outside relative to the center of the tire.

The invention relates more particularly to an apparatus using a flat mould comprising a first, lower, molding part and a second, upper, molding part each defining respectively the outer surface or the inner surface of the tread, at least one of these molding parts being movable between two positions corresponding to the opening and the closing of the mould.

Nowadays, the person skilled in the art has well mastered the mechanics and kinematics of opening and closing moulds which make it possible correctly to mould and vulcanize a tread. However, at present it is not known how to demold the tread over its entire length simultaneously, but only gradually. Thus the operation of demolding the tread remains tricky, or even is becoming trickier and trickier owing to the increasing complexity of the tread patterns produced on the treads.

In fact, on opening the mould, the tread remains in the lower molding part, which is generally the part defining the molding of its outer surface, and for effecting demolding, one great difficulty which is encountered is producing a "starting point" for detaching the tread, that is to say demolding one of the ends in the longitudinal direction of the tread. What is tricky about this operation is that it has to effect complete demolding of the end without producing defects due, for example, to tearing at the level of a tread pattern and with a minimum of stresses on the tread in order to avoid deformation of the latter.

Furthermore, nowadays frequently flat presses are used which alternately superpose lower and upper plates in order to have several moulds for the same amount of floor space but which of necessity offer a very limited mould-opening space. It is therefore desired that the demolding operation be capable of being effected in a very small space.

Various solutions have been proposed to try to resolve these difficulties. Thus, for example, publication JP 5-111921 describes a tread mould comprising two molding parts in which the part molding the outer surface of the tread bears at one of its longitudinal ends an inclined section intended to form a protuberance relative to the tread on emerging from vulcanization. This protuberance is intended to facilitate the "hooking" of the end in order to effect the demolding. Nevertheless, given its direction parallel to the mould and the thinness thereof, engaging this protuberance appears tricky, and in particular if the tractive effort necessary for demolding the tread has to be great, for example for treads for heavy vehicles.

The invention aims to overcome all these disadvantages.

SUMMARY OF THE INVENTION

According to the invention, the tire tread mould comprising a lower molding part and an upper molding part defining respectively the outer surface or the inner surface of a tread, one at least of the parts being movable between two positions corresponding to the opening and closure of the mould, is such that the upper molding part bears elements for hooking one of the longitudinal ends of the tread.

This embodiment makes it possible to demold one longitudinal end of the tread by anchoring said end in the upper molding part in effective manner in the space provided by the opening of the mould itself and without requiring external intervention.

The invention also relates to a molding and vulcanization apparatus which comprises a mould as described previously and progressive demolding means for the tread.

Advantageously, the progressive demolding means are formed by the end of a plate which can be translated on the lower molding part in the longitudinal direction.

This apparatus makes it possible effectively, with the progressive demolding means which cooperate with the zone of hooking of the mould by using the access to the tread created by the starting point for the demolding, to manage to demold the rest of the tread while satisfying the stresses in terms of space and effort which the tread will withstand. Furthermore, this plate makes it possible to both demold the tread and remove it.

BRIEF DESCRIPTION OF THE DRAWINGS

Other advantages and characteristics of the invention will become apparent on reading an example of embodiment of a tread molding and vulcanization apparatus according to the invention with reference to the drawings, in which.

Hereafter, the same references will designate the identical elements of the figures representing variants of the invention.

DETAILED DESCRIPTION OF THE INVENTION

Figure 1:
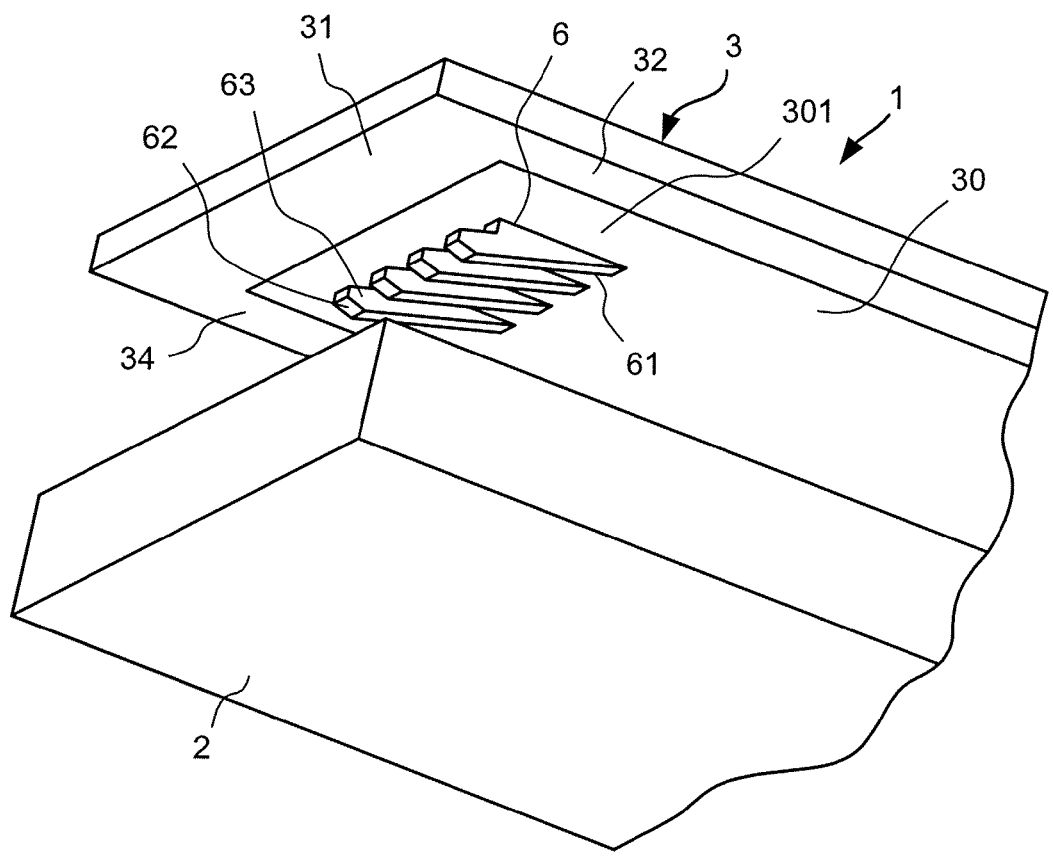
FIG. 1 is a partial perspective view of a mould according to the invention in its open position.
Figure 2:
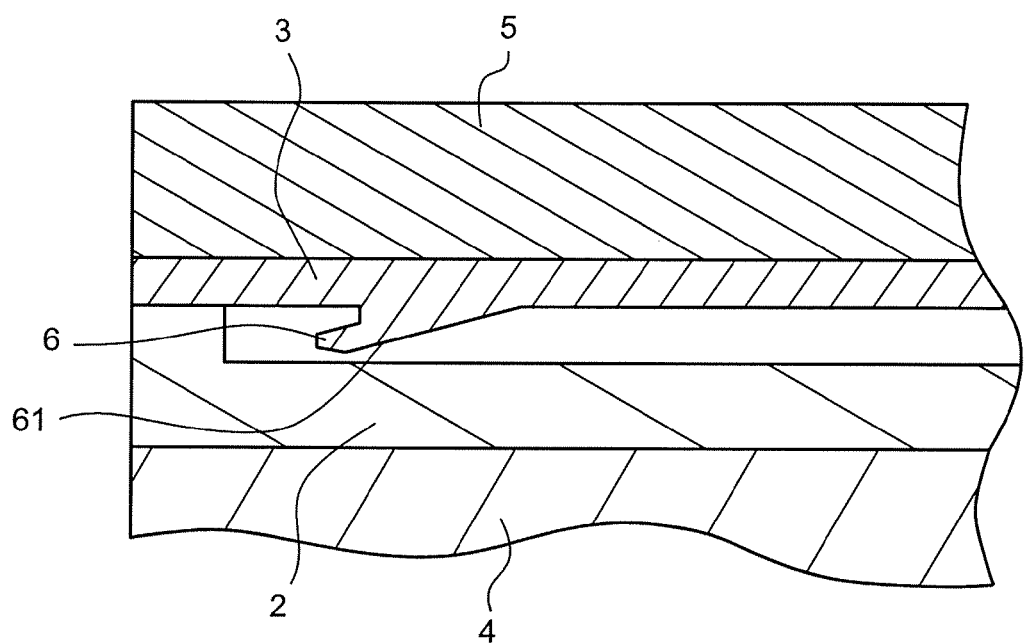
FIG. 2 is a meridian partial longitudinal section through the mould shown in FIG. 1.

In FIGS. 1 and 2, the mould 1 comprises a first and a second molding part 2 and 3 respectively which are connected to a lower press plate 4 and to an upper press plate 5. The first, lower, molding part 2 defines the outer surface of the tread, whereas the second molding part 3 defines the inner surface of the tread.

The form of the molding space shown in FIG. 1 corresponds to the molding of a tread having lateral edges without lateral "wings". However, these molding forms are given by way of example and do not constitute a limitation of the invention; the invention may, in fact, apply equally well to the molding of treads having longitudinal edges with or without lateral "wings" and whatever the form of the latter.

Conventional means (not shown), such as screw-nut systems, which enable each molding part to be connected to the corresponding press plate, are distributed regularly along the molding parts in order to provide a good connection between said molding parts and the plates.

Advantageously, each molding part may be produced in the form of adjoining sectors respectively coupled to the corresponding plate.

The upper plate 5 is displaceable relative to the lower plate 4 parallel to a transverse plane P1, that is to say vertically in FIGS. 1 and 2, in order to permit the opening and closing of the mould by displacing the upper molding part 3, and also to achieve intermediate positions. In order to obtain the movement of the upper plate 5, conventionally any suitable means are used, such as mechanical, hydraulic or pneumatic piston-cylinder units.

It will become clearly apparent on reading the rest of the description that a relative movement of the lower molding part relative to the upper molding part may be provided equally well without modifying the arrangement or the principle of operation of the invention.

Figure 3:
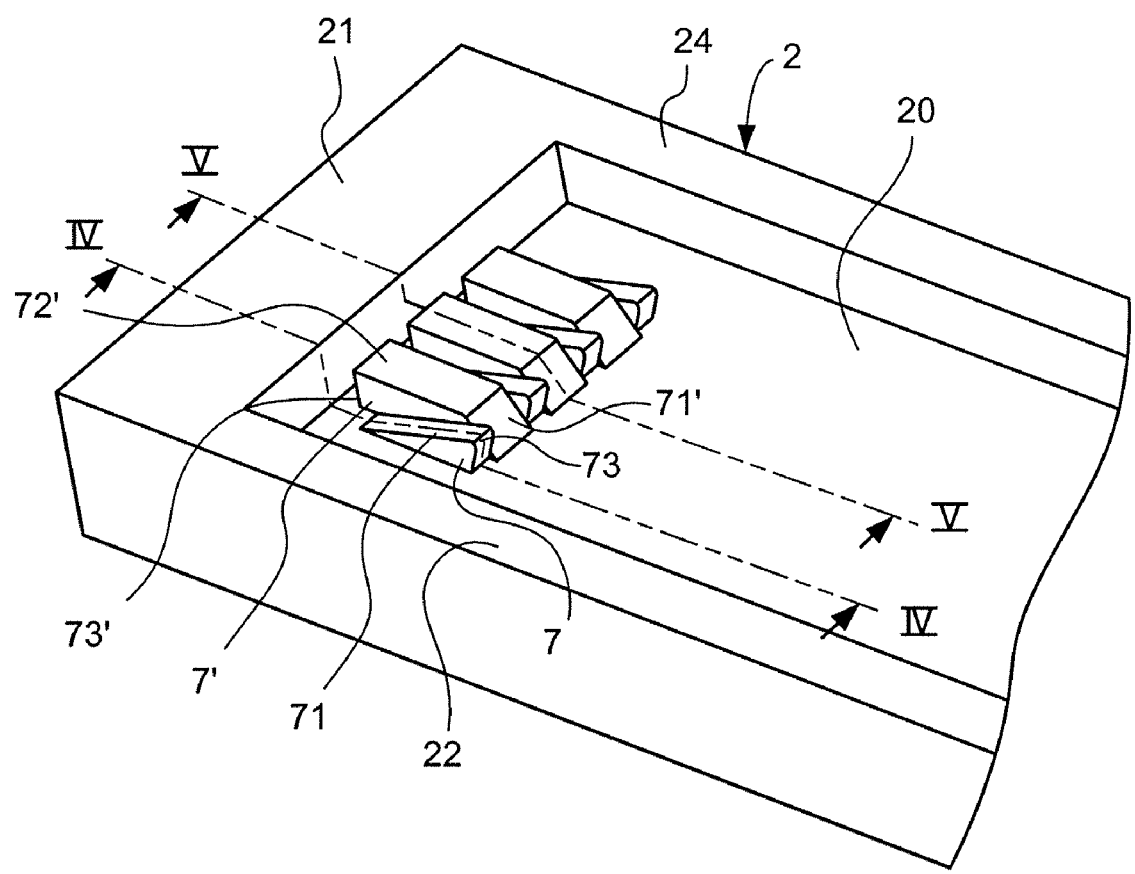
FIG. 3 is a partial perspective view of the lower part of the mould shown in FIG. 1 in accordance with a variant embodiment.

The lower molding part 2 has a surface 20 which is oriented towards the inside of the mould, for molding the outer surface of the tread, which bears the molding elements intended for producing the desired tread patterns, such as lamellae, beading, etc. This surface 20 is surrounded by raised edges, that is to say, edges oriented towards the upper molding part 3, for contact with said upper part 3. Those edges of the molding part 2 which are oriented along the length of the mould will be referred to hereafter as longitudinal edges 21, and those oriented along the width of the mould as transverse edges 22 and 24, as can be seen in FIG. 3. It is important that the edge 21 be raised to ensure when the mould is opened that the longitudinal end of the tread is held on the upper molding part, as will be seen again in detail in the rest of the description. The height of the other edges is more generally linked to the knowledge of the person skilled in the art for producing flat moulds in order to respect the take-up of the pressing and sealing forces of the mould edges.

The upper molding part 3 bears a surface 30, oriented towards the inside of the mould, for molding the inner surface of the tread which is surrounded by longitudinal edges 31 and transverse edges 32 and 34. These edges do not extend past the surface 30 in the example shown here, however it is entirely possible to conceive that they have a certain-height, in accordance with what has been said previously for the edges of the upper molding part.

The surface 30 bears at one of its ends 301 at least one protruding element 6 in the form of a hook, the free end 63 of which is oriented towards the outside of the mould in the longitudinal direction.

Advantageously, if a single hook 6 is provided, it will be preferred to position it transversely in the center of the width of the mould. This hook may extend over all or part of the width of the mould but it is also possible to conceive of a plurality of hooks 6 spaced across this width, such as shown in the example described and shown in FIG. 1. The choice of a plurality of hooks is particularly advantageous because during the molding and vulcanization of the tread, bridges of rubber are produced between the hooks which, at the end of the demolding phase, will increase the rigidity of the zone of rubber held in the hooks and thus facilitate the final extraction thereof.

As the hooks 6 shown are identical, a single hook will be described hereafter in detail with reference to FIG. 2.

The end opposite the free end 63 of the hook 6 relative to the center of said hook is formed by an inclined surface 61. The aim of the inclination of this surface is to facilitate the "unhooking" of the tread from the hook and to prevent, in particular, part of the already demolded tread from coming into contact with the hook during this operation and risking causing defects or deformations on the tread.

In this variant embodiment of the mould, the inclined surface 61 defines the molding of the longitudinal end of the tread, which may be different as will be seen hereafter. However in all cases, as the zone of the tread formed in the length of the mould between this inclined surface 61 and the longitudinal edge 21 of the lower molding part is intended to be trimmed, in actual fact this zone serves to effect the hooking and the starting point for the demolding.

It is also possible to provide, as shown in FIG. 2, a pointed shape for the free end 63 in order here too to then facilitate the demolding relative to the hooks.

In the closed position of the mould, the hook 6 is located in the molding space, the surface 62 of the hook 6 oriented towards the inside of the mould not being in contact with the surface 21 of the lower molding part 2.

Figure 4:
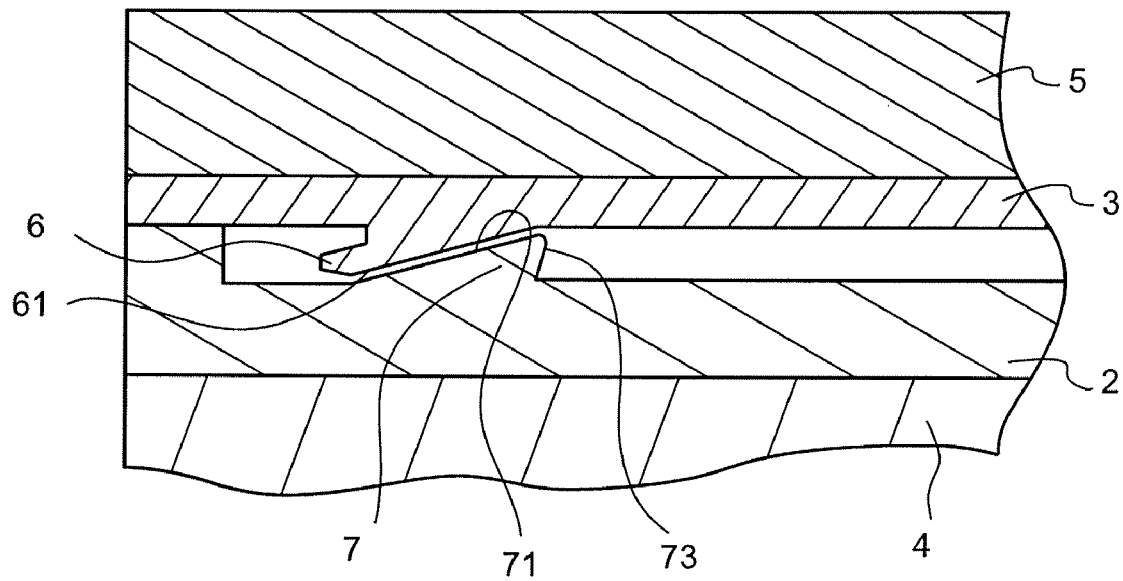
FIG. 4 is a partial longitudinal section through the mould along the line IV of FIG. 3, in the closed position of the mould.

According to variant embodiments of the invention shown in FIGS. 3 and 4, it is possible to conceive of elements being present which protrude from the lower molding part 2 opposite the hooks 6 in order to cooperate with the latter to provide various advantages. Thus, as shown in FIG. 4, hooks or teeth 7 may be provided on the lower molding part 2 which are oriented such that their free ends 73 are directed towards the outside of the mould in the longitudinal direction, and which have an inclined surface 71 intended to cooperate with the inclined surface 61 such that these two surfaces define between them a space for forming a tongue. In such an embodiment, the tongue may make it possible to accept the deformations of elongation which demolding risks causing. Furthermore, this form appears to be particularly advantageous in the case of an embodiment in which the upper molding part 3 also bears molding elements, because it is useful when the end 73 holds back the rubber slightly during the opening of the mould, thus making it possible to force correct demolding of the tread patterns borne by the surface 30 of the upper molding part 3.

FIG. 3 also shows a second variant which can be used at the same time as the teeth 7 as in this Figure, or separately. In this variant, which can be seen clearly in the section of FIG. 5, the lower molding part 2 comprises protruding elements 7' arranged so as to come inbetween the hooks 6 and which have a plane surface 72' and a surface 71' inclined towards the inside of the mould and an opposite surface 73' which with the raised edge 21 of the lower molding part defines a molding space of a length, in the longitudinal direction, less than that defined between the free end 63 of the hook 6 and said edge 21. This surface 73' makes it possible to create on the tread a "leading" edge on which a lever can exert a thrust in order to facilitate the operation of extracting the tread from the hook 6 at the end of demolding.

It is also conceivable to add a rubber-cutting element in order to effect the necessary trimming.

Furthermore, in order to carry out the rest of the demolding operation, the apparatus comprises progressive demolding means for the tread.

Figure 6A:
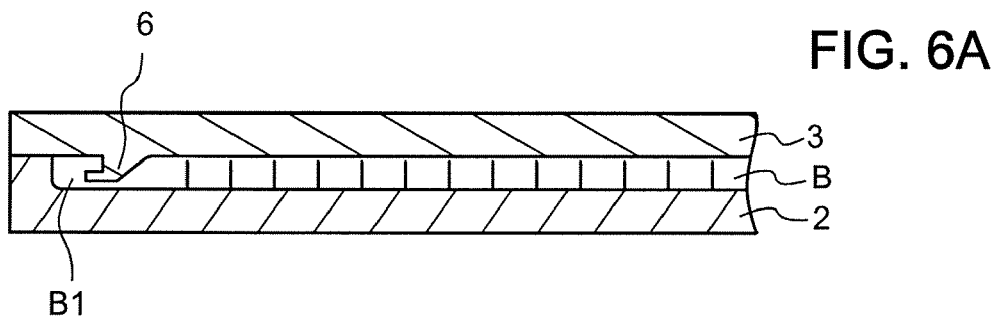
FIGS. 6A to 6D are partial diagrammatic views in longitudinal section of the apparatus, illustrating the operation of the latter during the demolding operation.
Figure 6B:
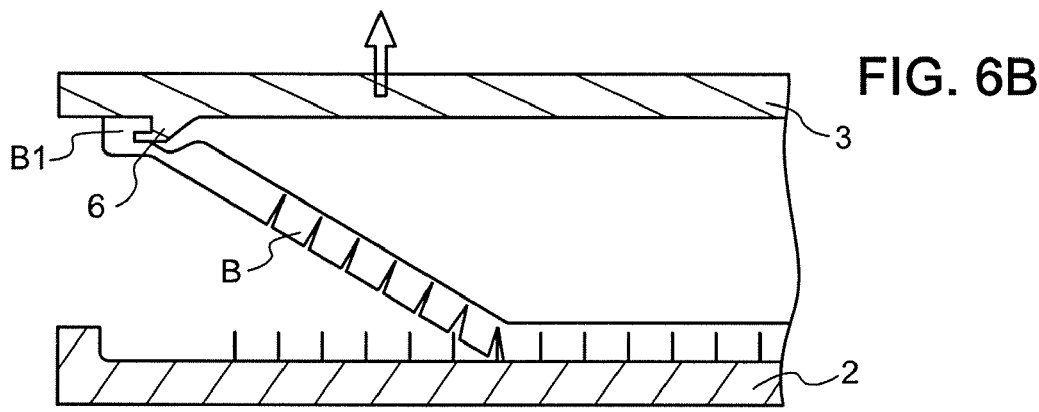
Figure 6C:
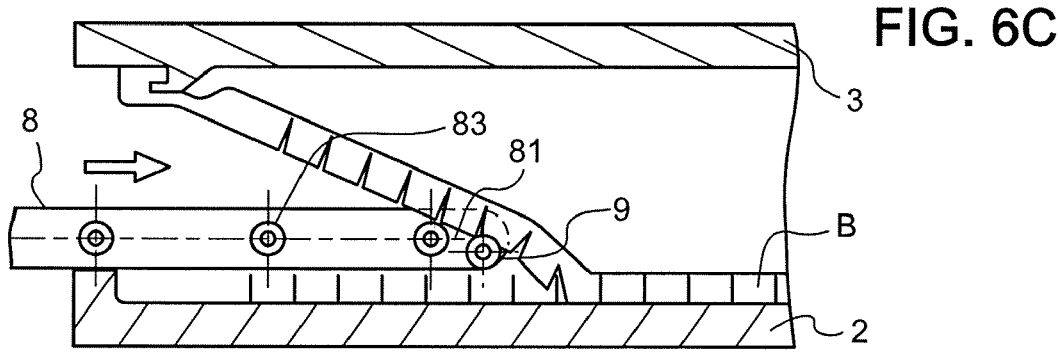
Figure 6D:
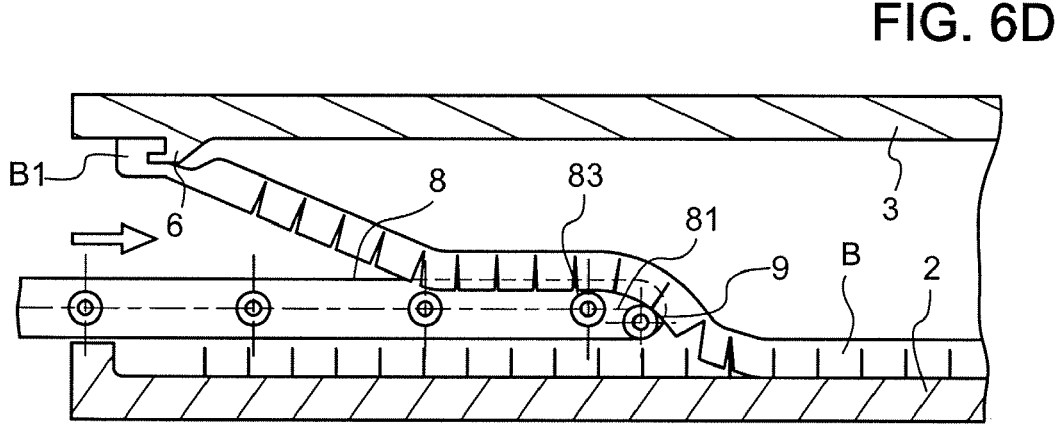

Thus, as shown in FIGS. 6C and 6D, the apparatus comprises a shoe 81 intended to effect the demolding of the tread locally and gradually once the longitudinal end thereof has been demolded.

The shoe 81 is formed by the end of a mobile plate 8 which can be moved longitudinally parallel to the molding parts. In particular, rollers, not shown, arranged at the transverse ends of the plate may make it possible to translate on the lower molding part by rolling over the longitudinal edges 22 and 24 of said part. These rollers may be in the form of wheels or extend over the entire width of the plate 8 with the aim of simplifying the embodiment.

The plate 8 may be formed of a plurality of successive sections which enables the assembly to have a certain flexibility, or of a single more rigid table, the plate in all cases comprising uprights extending in the longitudinal direction on which are mounted freely in rotation rollers 83 for receiving the tread. As will be seen more precisely in the description of the operation of the apparatus, the rollers 83 act as a support during demolding to facilitate this operation and also as a transport for the tread on emerging from the demolding.

The end 81 bears at least one roller 9 which by its rotation associated with the advance of the plate involves the progressive demolding of the tread. It is possible to conceive of the end 81 being produced in the form of a shovel, the thin end and the inclination of which would make it possible also to obtain the progressive detachment of the tread from the mould.

Figure 5:
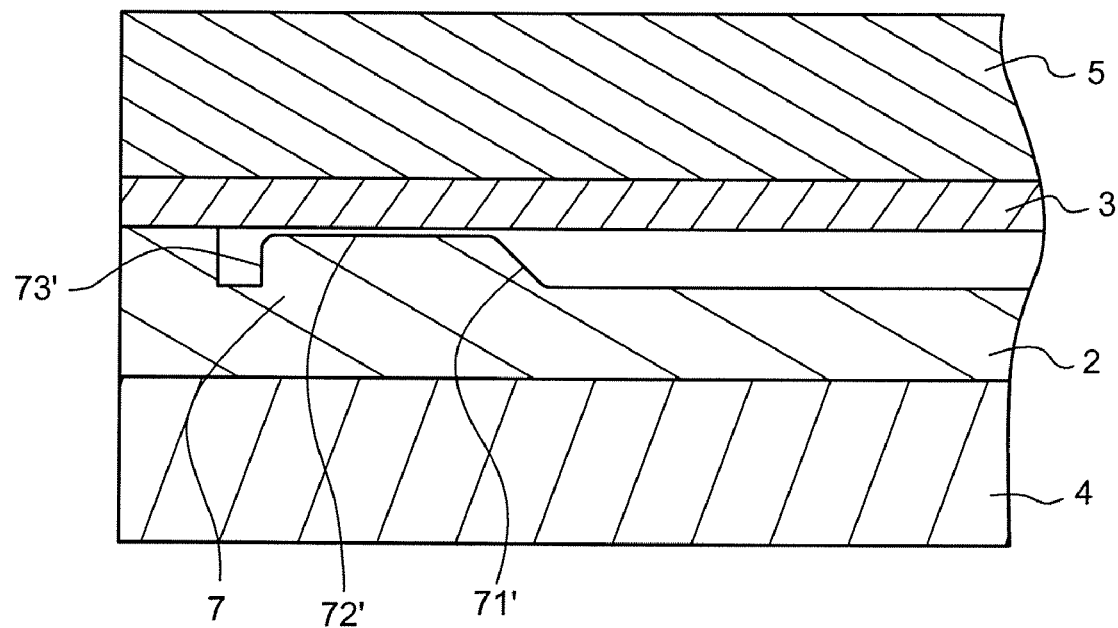
FIG. 5 is a partial longitudinal section through the mould along the line V of FIG. 3, in the closed position of the mould.

According to one variant (not shown), it is possible to conceive of the presence, whether connected or not to the plate 8, of a tilting lever which would make it possible, in the presence of a mould such as shown in FIG. 5, to exert a thrust on the surface of the tread defined by the surface 73' of the element 7' to facilitate the extraction from the hook, of the tread at the end of demolding.

Hereafter, the operation of demolding a tread B will be described succinctly with reference to FIGS. 6A to 6D, which represent the variant of the apparatus corresponding to FIG. 1, the operation corresponding to the other variant embodiments of the mould being able to be deduced from what follows using the preceding description elements.

FIGS. 6A to 6D are sections in the longitudinal direction on which only a longitudinal end of the molding and vulcanization apparatus is shown, which corresponds to the end of the upper molding part bearing hooks 6. What happens for only one hook 6 will be described here.

The mould shown in FIG. 6A is in the closed position, the longitudinal and transverse edges of the lower molding part 2 being in contact with the upper molding part 3 as can be seen for the longitudinal edge 21 shown here. The tread B occupies the entire molding space, its end B1 being molded around the hook 6.

Using the mechanical, hydraulic or pneumatic means referred to previously, the mould 1 is opened by vertically translating the upper molding part 3.

As can be seen in FIG. 6B, the tread B is entrained by its end B1 which is engaged in the hook 6, following the displacement of the molding part 3, which involves the detachment thereof from the lower molding part 2.

The force exerted on the end B1 by means of the hook 6 has entrained the latter, the displacement of which has been guided by sliding contact with the edge 21 of the lower molding part 2. This contact with the edge 21 makes it possible to prevent the traction exerted on the tread, and more precisely on the end B1 during opening of the mould, from causing rotation of said end so as to become disengaged from the hook 6.

As shown by FIG. 6B, the hooking of the end B1 of the tread on the upper molding part 3 upon opening of the mould creates a disengagement space which permits access for another type of demolding means between the tread and the lower molding part 2.

Thus the plate 8 is used which is translated parallel to the lower molding part 2 on the edges 22 and 24 of the lower molding part 2, until the roller 9 which is free in rotation comes in contact with the tread.

The free rotation of the roller 9 associated with the advance of the plate 8 is then sufficient to locally demold the tread, as can be seen in FIG. 6C, and thus gradually the entire tread.

The tread B during this demolding naturally rests on the plate 8, which does not however adversely affect the advance of the plate owing to the rollers 83 on which the tread is translated longitudinally, as can be seen in FIG. 6D.

When the plate 8 has permitted complete demolding of the tread B, the latter therefore rests on the rollers 83 with the exception of its end B1, which is still engaged with the hook 6. In order to extract the end B1, a reverse movement of the plate is sufficient, particularly when, as in the example described here, there are several hooks 6 spaced apart which have created in their interstices more rigid zones which facilitate this operation.

As mentioned previously in the case of more complex tread patterns, the presence of demolding elements 7' may be advantageous to provide a lever which tilts in contact with the tread and adds its action by thrust to the end B1 upon retreat of the plate 8 in order to disengage said [end] B1. It is also possible to effect a forward movement of the plate 8 which would force the tilting of the end B1 around the hooks 6, although this solution risks causing additional deformation to the tread.

Without departing from the scope of the invention, it would also be possible to envisage a mechanical device which makes it possible to facilitate the disengagement from the hooks 6 such as, for example, the hooks 6 mounted to tilt towards the center of the mould about spindles borne by the upper molding part 3.

On emerging from the demolding operation, the tread B rests on the plate 8, which may then also serve as transport for the tread to leave the space between the upper 3 and lower 2 molding parts of the mould.

What is claimed is:

1. A tire tread mould comprising a lower molding part and an upper molding part defining respectively the outer surface and the inner surface of a tread, at least one of the parts being movable between two positions corresponding to the opening and closure of the mould, wherein the upper molding part has elements for hooking a longitudinal end of the tread, the hooking elements are formed by at least one hook, the hook having a free end oriented longitudinally towards the outside of the mould and an inclined surface opposite its free end to facilitate the retraction of said hook.

2. The mould of claim 1, wherein the hooking elements protrude relative to a surface of the upper molding part.

3. The mould of claim 1, wherein the hook extends transversely over at least part of the width of the upper molding part.

4. The mould of claim 1, wherein the hooking elements comprise several hooks spaced in the transverse direction.

5. The mould of claim 1, wherein the hook has a pointed free end.

6. The mould of claim 1, wherein the lower molding part has at least one raised transverse edge which cooperates with the hooking elements of the upper molding part.

7. The mould of claim 1, wherein the lower molding part has protruding elements to cooperate with the elements of the upper molding part.

8. A tire tread mould comprising a lower molding part and an upper molding part defining respectively the outer surface and the inner surface of a tread, at least one of the parts being movable between two positions corresponding to the opening and closure of the mould, wherein the upper molding part has elements for hooking a longitudinal end of the tread, the lower molding part has protruding elements to cooperate with the elements of the upper molding part, and the protruding elements of the lower molding part are formed at least by a hook having a free end oriented longitudinally towards the inside of the mould.

9. A tire tread mould comprising a lower molding part and an upper molding part defining respectively the outer surface and the inner surface of a tread, at least one of the parts being movable between two positions corresponding to the opening and closure of the mould, wherein the upper molding part has elements for hooking a longitudinal end of the tread, the lower molding part has protruding elements to cooperate with the elements of the upper molding part, and the protruding elements of the lower part of the mould comprise a molding surface for a leading edge on the tread to facilitate unhooking from the hooking elements of the upper molding part.

10. A molding and vulcanization apparatus for tire treads comprising a mould of claim 1, which comprises progressive demolding means for the tread.

11. A molding and vulcanization apparatus for tire treads comprising a tire tread mould and progressive demolding means for the tread, the tire tread mould comprising a lower molding part and an upper molding part defining respectively the outer surface and the inner surface of a tread, at least one of the parts being movable between two positions corresponding to the opening and closure of the mould, wherein the upper molding part has elements for hooking a longitudinal end of the tread, and the progressive demolding means are formed by the end of a plate which can be translated on the lower molding part in the longitudinal direction.

12. The apparatus of claim 11, wherein the end of the plate comprises at least one roller extending in the transverse direction, mounted freely in rotation.

13. The apparatus of claim 11, wherein the end of the plate is in the form of a shovel.

14. The apparatus of claim 11, wherein the plate comprises rollers extending in the transverse direction of support of the tread, said rollers being free in rotation.

15. The apparatus of claim 11, wherein the plate is mounted to be translatable relative to the lower molding part by means of rollers extending in the transverse direction which are mounted freely in rotation which cooperate with the longitudinal edges of said lower molding part.

* * * * *

UNITED STATES PATENT AND TRADEMARK OFFICE
CERTIFICATE OF CORRECTION

| | | |
|---|---|---|
| PATENT NO. | : 7,186,103 B2 | Page 1 of 1 |
| APPLICATION NO. | : 10/773469 | |
| DATED | : March 6, 2007 | |
| INVENTOR(S) | : Gilbert Menard | |

It is certified that error appears in the above-identified patent and that said Letters Patent is hereby corrected as shown below:

On The Title Page, Item
[75] INVENTOR

"Gilbert Menard, Domicile (FR)" should read --Gilbert Menard, Volvic (FR)--.

[56] REFERENCES CITED

Foreign Patent Documents
"JP 05111921 5/1993" should read --JP 5-111921 5/1993--.

COLUMN 3

Line 52, "certain-height," should read --certain height,--.

Signed and Sealed this

Twenty-seventh Day of November, 2007

JON W. DUDAS
*Director of the United States Patent and Trademark Office*